UNITED STATES PATENT OFFICE.

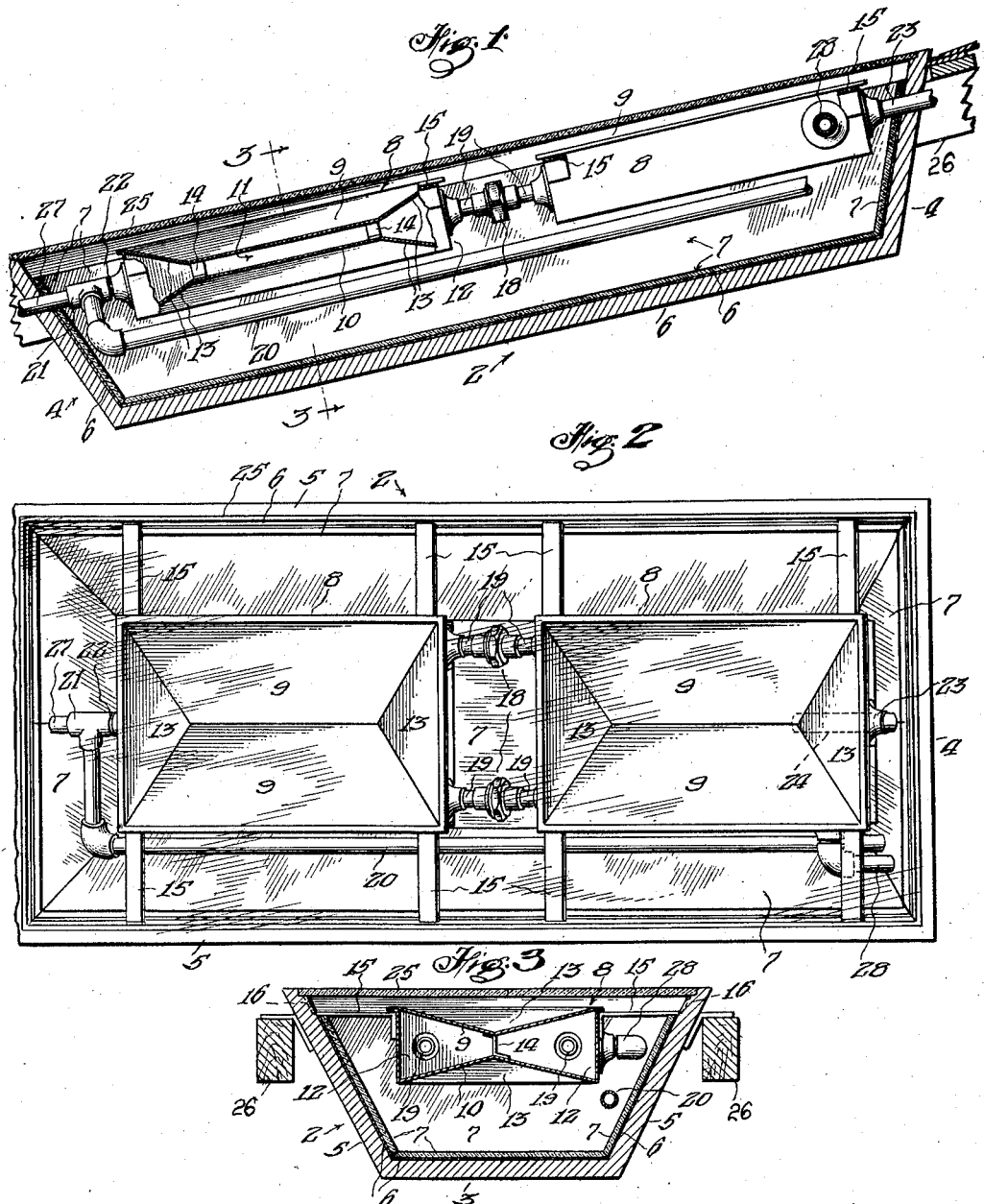

LINVILL L. ROUNTREE, OF COLTON, CALIFORNIA.

SOLAR HEATER.

1,003,514.  Specification of Letters Patent.  Patented Sept. 19, 1911.

Application filed December 12, 1910. Serial No. 596,993.

*To all whom it may concern:*

Be it known that I, LINVILL L. ROUNTREE, a citizen of the United States of America, residing at Colton, in the county of San Bernardino, State of California, have invented a certain new and useful Solar Heater; and I do hereby declare the following to be a full, clear, and exact description of the invention, such as will enable others skilled in the art to which it appertains to make and use the same.

This invention relates to solar heaters, and it may be said to consist in the novel construction, arrangement and combination of parts therein as will appear from the description hereinafter and as set forth in the claims.

Objects of the invention are to provide a novel construction for the container of the fluid whereby quick heating of the fluid may be accomplished and also whereby only the warmer part of the fluid in the container may be drawn off.

Other objects of the invention are, to form each container to provide for increased heating surfaces on the top and bottom thereof and effective circulation of the fluid therein, and also to so arrange and interconnect the containers that the fluid therein is effectively circulated and consequently heated more quickly.

Further objects and the advantages of the invention will be apparent to those skilled in the art from a consideration of the following description of the preferred form of construction embodying the invention, taken in connection with the accompanying drawings, in which—

Figure 1 is a side elevation of a construction having the invention applied therein, some of the parts being shown in section, Fig. 2 is a plan view of the construction having the invention applied therein, and Fig. 3 is a section taken on the line 3—3 of Fig. 1.

A tight box 2, preferably of wood, and having a bottom 3 and diverging ends 4 and diverging sides 5, may have its interior lined with a layer of asbestos 6. Disposed on the bottom and on the end and side walls on the interior of the box and preferably resting against the asbestos lining, are plates 7 of suitable reflecting material. These plates may consist of glass mirrors which may have a coating of black enamel or the like on the back thereof. The container 8 for the fluid to be heated may be arranged, as shown, to occupy an upper central position on the interior of the box 2; it is preferably constructed of galvanized sheet iron and may be blackened to augment its heat absorbing capacity. In order to accomplish effective circulation and consequently quick heating of the fluid in the container, the top 9 and the bottom 10 thereof are formed converging from the sides and ends toward the central portion of the container. As shown, the top and bottom of the container may each be formed to have the central portion 11 thereof spaced nearest together, and to have the side portions 12 and the end portions 13 converging toward the central portion 11. Struts 14 on the interior of the container may be secured between the central portion of the top and bottom thereof. The container may be supported in position in the box 2 by means of lugs 15 secured on the sides of the container and extending into recesses 16 in the interior side walls of the box. It is contemplated that a plurality of the containers may be connected together, in which event they are preferably arranged in the box to have a space between them to admit of solar rays passing to the bottom reflecting plate and may be connected together by means of unions 18 joining the pipes 19 on the ends of the containers near each side thereof. The supply pipe 20 may lead to the T-connection 21 on the influent pipe 22 on the lower container, and the effluent pipe 23 on the upper container may have an extension 24 on the interior of the container whereby the warmer portion of the water may be drawn off first. A glass cover 25 may be tightly fitted on the top of the box 2 in any suitable or approved manner.

It will be understood by those skilled in the art that the box 2 may be secured to a suitable framework 26, partly shown in Figs. 1 and 3, and it may be suitably inclined in position and conveniently located at an elevation to have the parts of the heater most advantageously exposed to the rays of the sun and to permit of the heated water moving by force of gravity through service pipes to points where it is desired to be used; also it will be understood that if desired the fluid in the containers may also be heated by any suitable auxiliary heater having a coil connected to pipes 27 and 28 respectively leading from T-connection 21 on pipe 22 on the lower container and leading into the top portion of the upper container at the side thereof. It will be noted that the arrangement of the containers and the connections therebetween are such that effective circulation of the fluid therein is accomplished whereby it results that the fluid is quickly heated.

I claim:

1. In a solar heater, the combination of a box formed with outwardly inclined sides, reflectors applied to the bottom and inclined sides of the box upon the interior thereof, a transparent cover for the box, a substantially flat liquid container arranged within the upper central portion of the box, supporting lugs projecting from the sides of the box for supporting the liquid container, the top and bottom of the said container being depressed at the middle portions thereof, and circulation pipes communicating with the container.

2. In a solar heater, the combination of a box formed with outwardly inclined sides, reflectors applied to the bottom and inclined sides of the box upon the interior thereof, a transparent cover for the box, a series of substantially flat containers arranged in the upper portion of the box, the said containers being spaced from each other and having the top and bottom thereof depressed at their central portions, unions connecting the various containers, and circulation pipes communicating with the containers.

3. In a solar heater, the combination of a box having outwardly inclined sides, reflectors applied to the bottom and inclined sides of the box upon the interior thereof, a transparent cover for the box, a substantially flat container arranged in the upper central portion of the box, the top and bottom of the said container being depressed inwardly toward each other at their central portions, struts connecting the depressed portions of the top and bottom of the container, supporting lugs projecting from the sides of the box and engaging the container to hold it in position, and circulation pipes communicating with the container.

4. In a solar heater, the combination of a box, reflectors applied to the interior of the box, a plurality of fluid containers arranged within the box, each of the said containers being substantially flat and having the top and bottom thereof depressed inwardly toward each other at their central portions, a pair of pipes projecting from each end of each of the containers, and unions connecting the corresponding pipes of adjacent containers.

In testimony whereof I have signed my name to this specification in the presence of two subscribing witnesses at Colton county of San Bernardino, State of California, this 2nd day of Dec. A. D. 1910.

LINVILL L. ROUNTREE.

Witnesses:
 ALEX C. DOUGALD,
 M. O. HERT.

---

Copies of this patent may be obtained for five cents each, by addressing the "Commissioner of Patents. Washington, D. C."